(12) United States Patent
Abdelsalam et al.

(10) Patent No.: US 11,686,901 B2
(45) Date of Patent: Jun. 27, 2023

(54) OPTICAL POLARIZER WITH VARYING WAVEGUIDE CORE THICKNESS AND METHODS TO FORM SAME

(71) Applicant: GlobalFoundries U.S. Inc., Malta, NY (US)

(72) Inventors: Aboketaf Abdelsalam, Essex Junction, VT (US); Yusheng Bian, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 0 days.

(21) Appl. No.: 17/448,804

(22) Filed: Sep. 24, 2021

(65) Prior Publication Data
US 2023/0097528 A1   Mar. 30, 2023

(51) Int. Cl.
    *G02B 6/27*   (2006.01)
(52) U.S. Cl.
    CPC .................... *G02B 6/2773* (2013.01)
(58) Field of Classification Search
    CPC .................................................... G02B 6/2773
    See application file for complete search history.

(56) References Cited

U.S. PATENT DOCUMENTS

| | | | | |
|---|---|---|---|---|
| 6,240,233 B1 * | 5/2001 | Weinert | .................. | G02B 6/305 385/28 |
| 10,302,866 B2 * | 5/2019 | Lin | ........................ | G02B 6/126 |
| 10,641,956 B1 | 5/2020 | Bian et al. | | |
| 10,871,614 B1 | 12/2020 | Bian et al. | | |
| 11,105,978 B2 | 8/2021 | Bian et al. | | |
| 2019/0079243 A1 * | 3/2019 | Lebby | .................. | G02B 6/1228 |
| 2021/0199887 A1 | 7/2021 | Bian et al. | | |
| 2021/0215873 A1 | 7/2021 | Bian et al. | | |

OTHER PUBLICATIONS

Bian et al., "Monolithically integrated silicon nitride platform," OFC 2021, OSA 2021, 3 pages.
Bian et al., "Towards low-loss monolithic silicon and nitride photonic building blocks in state-of-the-art 300 mm CMOS foundry," Frontiers in Optics, Laser Science OSA 2020, 2 pages.

(Continued)

*Primary Examiner* — Sung H Pak
(74) *Attorney, Agent, or Firm* — Anthony Canale; Hoffman Warnick LLC

(57) ABSTRACT

Embodiments of the disclosure provide an optical polarizer with a varying vertical thickness, and methods to form the same. An optical polarizer according to the disclosure may include a first waveguide core over a semiconductor substrate. A first cladding material is on at least an upper surface of the first waveguide core. A second waveguide core over the first waveguide core and above the first cladding material. The second waveguide core includes a first segment having a vertical thickness that varies along a length of the first segment. A second cladding material is at least partially surrounding the second waveguide core. Transfer of one of a transverse electric (TE) mode signal and a transverse magnetic (TM) mode signal from the first waveguide core to the second waveguide core occurs between the first segment of the second waveguide core and the first waveguide core.

20 Claims, 13 Drawing Sheets

(56) References Cited

OTHER PUBLICATIONS

Choo et al., "Nanofocusing in a metal-insulator-metal gap plasmon waveguide with a three-dimensional linear taper," Nature Photonics, Advance Online Publication, published online Nov. 18, 2012, 1-7.

Dai et al., "Compact broadband polarizer based on shallowly-etched silicon-on-insulator ridge optical waveguides," Optics Express, vol. 18, No. 26, Dec. 20, 2010, 27404-27415.

Giewont et al., "300-mm Monolithic Silicon Photonics Foundry Technology," IEEE Journal of Selected Topics in Quantum Electronics, vol. 25, No. 5, Sep./Oct. 2019, 11 pages.

Huang et al., "CMOS compatible horizontal nanoplasmonic slot waveguides TE-pass polarizer on silicon-on-insulator platform," Optics Express, vol. 21, No. 10, May 20, 2013, 12790-12796.

Mu et al., "Edge Couplers in Silicon Photonic Integrated Circuits: A Review," Appl. Sci. 2020, 10, 29 pages.

Ng et al., "Integrated Cu-based TM-pass Polarizer using CMOS Technology Platform," KAUST Academic Excellence Alliance (AEA) 2010 Grant, 3 pages.

Rakowski et al., "45nm CMOS-Silicon Photonics Monolithic Technology (45 CLO) for next-generation, low power and high speed optical interconnects," downloaded from IEEE Xplore on Nov. 15, 2020, 3 pages.

Son et al., "High-efficiency broadband light coupling between optical fibers and photonic integrated circuits," Nanophotonics 2018, https://doi.org/10.1515/nanoph-2018-0075, 20 pages.

Xiong et al., "High Extinction Ratio and Broadband Silicon TE-Pass Polarizer Using Subwavelength Grating Index Engineering," IEEE Photonics Journal, vol. 7, No. 5, Oct. 2015, 8 pages.

Yin et al., "Ultra-compact TE-pass polarizer with graphene multilayer embedded in a silicon slot waveguide," Optics Letters, vol. 40, No. 8, Apr. 15, 2015, 1733-1736.

Zhang et al., "Wideband and Compact TE-Pass/TM-Stop Polarizer Based on a Hybrid Plasmonic Bragg Grating for Silicon Photonics," Journal of Lightwave Technology, vol. 32, No. 7, Apr. 1, 2014, 1383-1386.

* cited by examiner

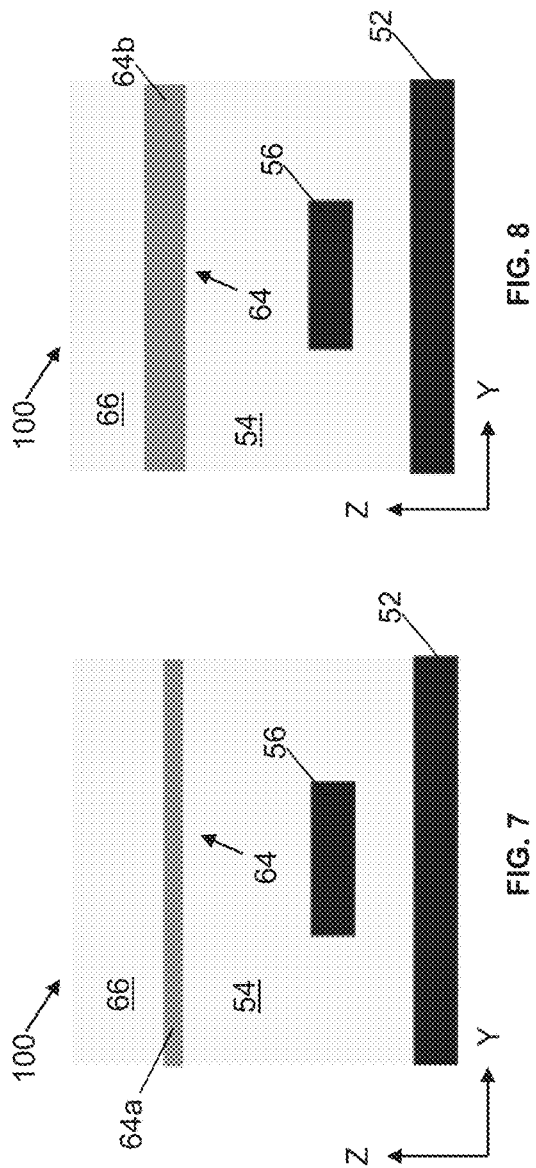
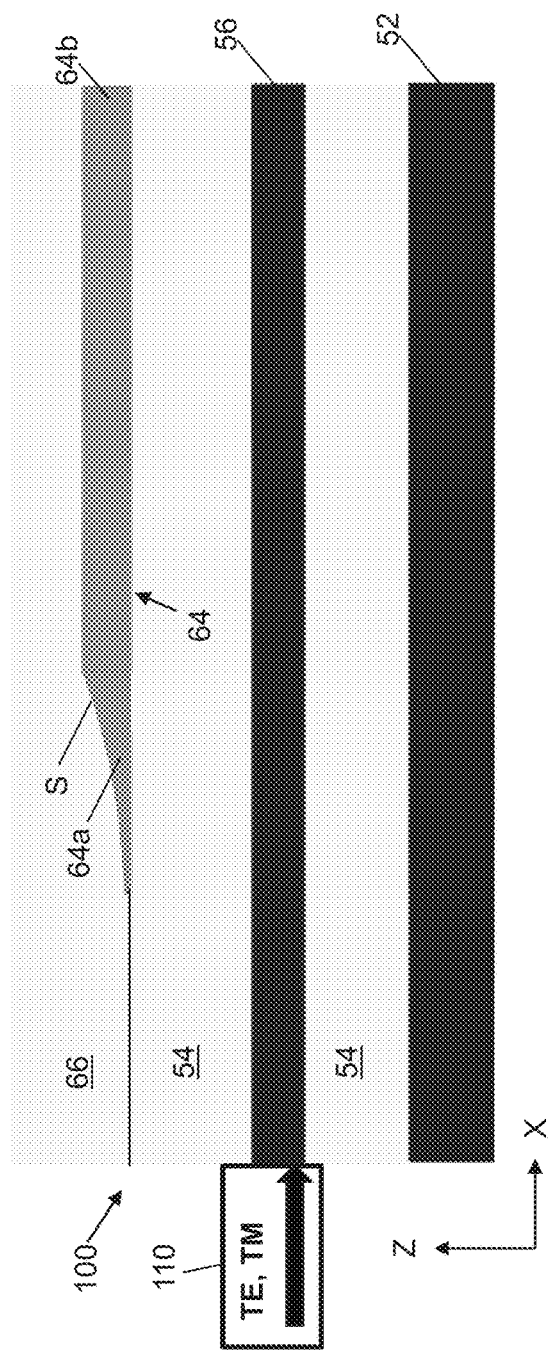

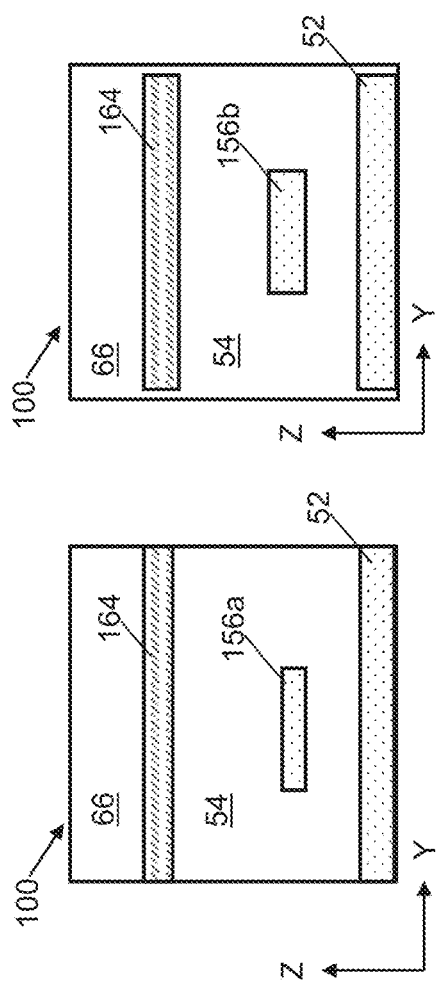
FIG. 11
FIG. 12
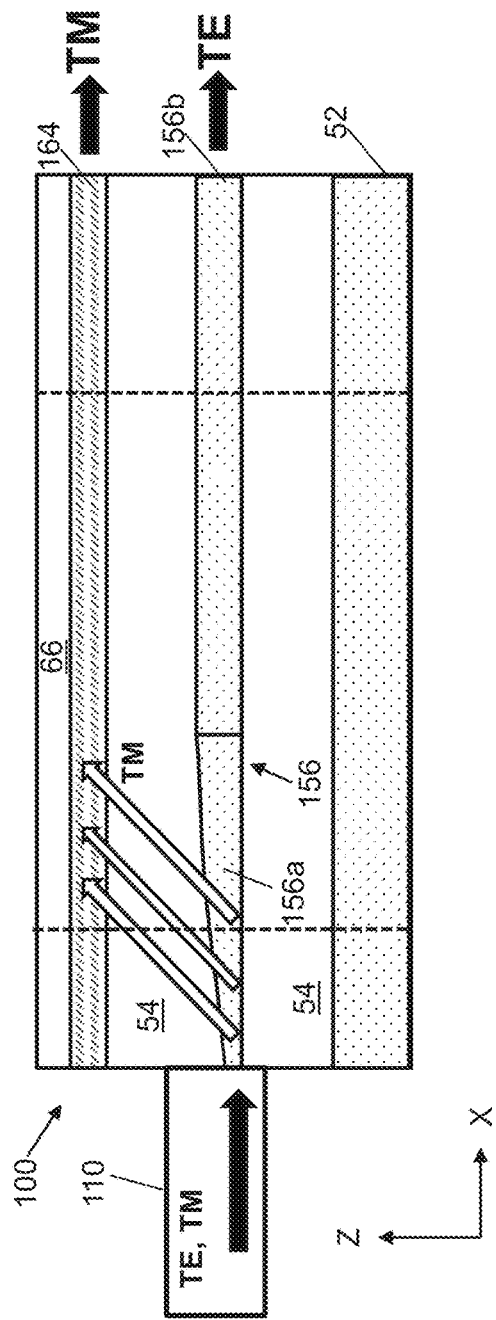
FIG. 13

OPTICAL POLARIZER WITH VARYING WAVEGUIDE CORE THICKNESS AND METHODS TO FORM SAME

TECHNICAL FIELD

The subject matter disclosed herein relates to the transmission of optical signals in a photonic integrated circuit (PIC). More specifically, the disclosure relates to an optical polarizer with a waveguide core of varying vertical thickness, and related methods to form the same.

BACKGROUND

The rise of networking devices, such as the "Internet of Things" (IoT), with links to a data center has accompanied a larger number of signal-processing elements in semiconductor wafers. Semiconductor chips may be modified, adapted, etc., to house the various components needed to transport optical signals from one component to another. Semiconductor chips which include photonic devices and microcircuitry are known as "photonic integrated circuits" (PICs). PIC dies typically include optical components on the surface, embedded in, and/or at the edge of a PIC die to transport optical signals into and/or from the optical devices therein, such as waveguides and grating couplers. The various optical components, e.g., photonic waveguides, photonic transmitters, receivers, etc., can relay signals through the PIC die.

The use of optical polarizers to split optical signals into different modes may present technical challenges. Optical polarizers include multiple optically transmissive materials that conventionally occupy substantial surface area within the PIC die structure. Optical polarizers, depending on their structure, may exhibit significantly high amounts of back reflection and crosstalk, thus producing signal loss from radiation-mode coupling or absorption.

SUMMARY

Aspects of the present disclosure provide an optical polarizer, including: a first waveguide core over a semiconductor substrate; a first cladding material on at least an upper surface of the first waveguide core; a second waveguide core over the first waveguide core and above the first cladding material, wherein the second waveguide core includes a first segment having a vertical thickness that varies along a length of the first segment; and a second cladding material at least partially surrounding the second waveguide core, wherein transfer of one of a transverse electric (TE) mode signal and a transverse magnetic (TM) mode signal from the first waveguide core to the second waveguide core occurs between the first segment of the second waveguide core and the first waveguide core.

Further aspects of the present disclosure provide an optical polarizer, including: a first waveguide core over a semiconductor substrate; at least one oxide layer on an upper surface of the first waveguide core; and a second waveguide core on the at least one oxide layer and vertically aligned with the first waveguide core, wherein the second waveguide core includes a first segment having a vertical thickness that varies along a length of the first segment, wherein one of a transverse electric (TE) mode signal and a transverse magnetic (TM) mode signal is coupled between the first waveguide core and the first segment of the second waveguide core.

Another aspect of the present disclosure provides a method of forming an optical polarizer, the method including: forming a first waveguide core over a substrate; forming a first cladding material over the substrate and on at least an upper surface of the first waveguide core; forming a second waveguide core over the first waveguide core and the first cladding material, wherein the second waveguide core includes a first segment having a vertical thickness that varies along a length of the first segment; and forming a second cladding material on the first cladding material and at least partially surrounding the second waveguide core, wherein transfer of one of a transverse electric (TE) mode signal and a transverse magnetic (TM) mode signal from the first waveguide core to the second waveguide core occurs between the first segment of the second waveguide core and the first waveguide core.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 7 shows a first cross-sectional view in plane Y-Z of an optical polarizer with a waveguide core of varying vertical thickness according to embodiments of the disclosure.

FIG. 8 shows a second cross-sectional view in plane Y-Z of an optical polarizer with a waveguide core of varying vertical thickness according to embodiments of the disclosure.

FIG. 9 shows a third cross-sectional view in plane X-Z of an optical polarizer with a waveguide core of varying vertical thickness according to embodiments of the disclosure.

FIG. 11 shows a first cross-sectional view in plane Y-Z of an optical polarizer with a lower waveguide core of varying vertical thickness according to further embodiments of the disclosure.

FIG. 12 shows a second cross-sectional view in plane Y-Z of an optical polarizer with a lower waveguide core of varying vertical thickness according to further embodiments of the disclosure.

FIG. 13 shows a third cross-sectional view in plane X-Z of an optical polarizer with a lower waveguide core of varying vertical thickness according to further embodiments of the disclosure.

Figure 1:
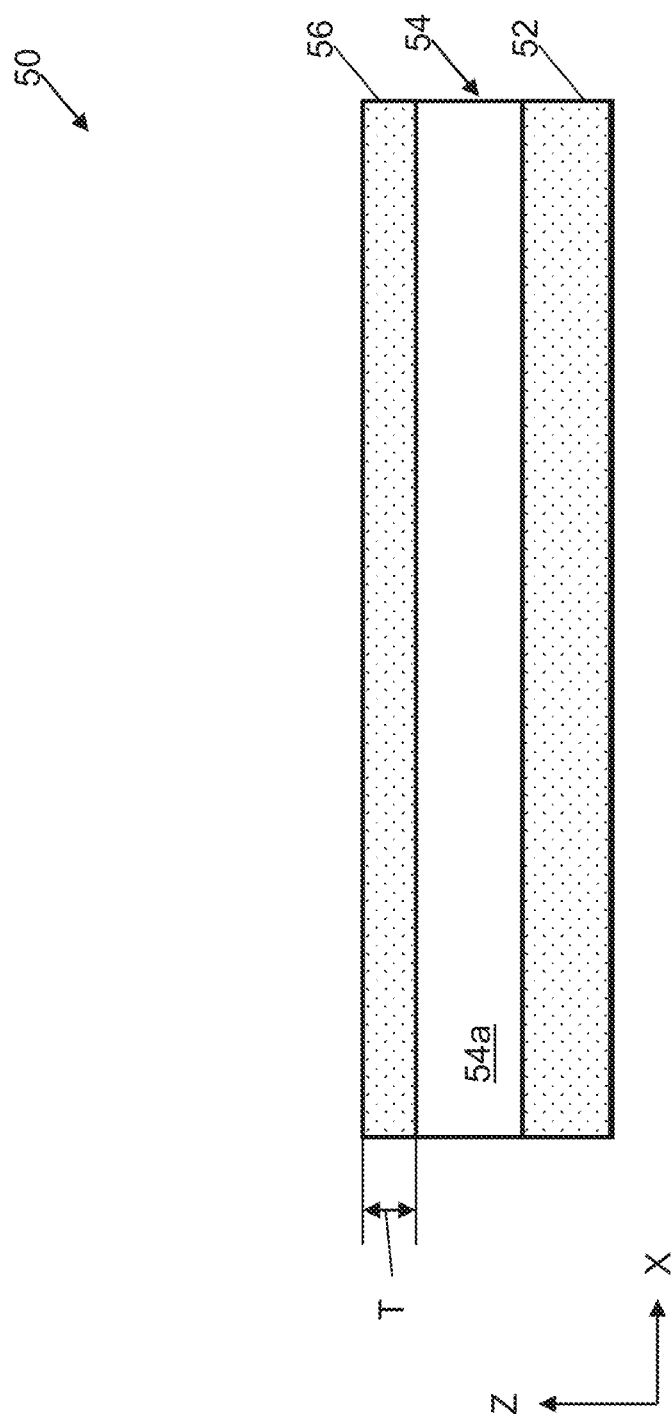
FIGS. 1-5 depict methods of forming an optical polarizer according to embodiments of the disclosure.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

In the following description, reference is made to the accompanying drawings that form a part thereof, and in which is shown by way of illustration specific illustrative embodiments in which the present teachings may be practiced. These embodiments are described in sufficient detail to enable those skilled in the art to practice the present teachings, and it is to be understood that other embodiments may be used and that changes may be made without departing from the scope of the present teachings. The following description is, therefore, merely illustrative.

The present disclosure provides an optical polarizer for a photonic integrated circuit (PIC). Optical polarizers according to the disclosure may include a first waveguide core over a semiconductor substrate. A region of cladding material is on at least an upper surface of first waveguide core, optionally partially or fully surrounding the first waveguide core. A second waveguide core is over the first waveguide core. The second waveguide core includes a first segment with a vertical thickness that varies along a length of the first segment. Transfer of a transverse electric (TE) mode signal or a transverse magnetic (TM) mode signal from the first waveguide core occurs between the first segment of the second waveguide core and the first waveguide core. Another region of cladding material is on the first cladding material and at least partially surrounds the second waveguide core.

An optical polarizer is an optical filtering device for separating beams of radiation based on their polarization, e.g., by blocking certain polarizations from passing through the filter or otherwise redirecting them into another optical medium. The polarization of radiation refers to the geometric orientation of its wave oscillations. Wave oscillations are oriented perpendicularly with respect to the direction of motion in a transverse wave. A TE mode signal and a TM mode signal are two types of optical transverse waves. TM mode radiation features a magnetic field that is transverse to the direction of propagation. TE mode radiation features an electric field that is transverse to the direction of propagation. A single optical signal may carry both types (i.e., TE and TM modes) of transverse waves, but some components within a PIC die may process only one of the two radiation polarizations. Optical polarizers according to the disclosure may receive incoming optical signals and split such signals into their TE mode and TM mode components.

Embodiments of the disclosure provide an optical polarizer for a PIC die, including two waveguide cores each at least partially within a cladding material (e.g., an oxide or other material permitting radiation passage therethrough). Radiation from a signal source may enter the optical polarizer through one of the waveguide cores. The first waveguide core may be within a first cladding material and located above the substrate. The first waveguide core may be formed of silicon and/or other suitable waveguide materials. A second waveguide core is above the first waveguide and first cladding material. The second waveguide core itself may be at least partially surrounded by a second cladding material and may have a material composition that is the same as, or different from the first waveguide core. The second waveguide core may have a first segment that varies in geometry, such as thickness and/or width of the waveguide core, along a length of the first segment. The variation in geometry creates a mode-matching region between the first waveguide core and the second waveguide core for either the TE mode or the TM mode, depending upon design of the polarizer, thus enabling gradual a TE or TM mode signal to gradually enter the first waveguide core between the first waveguide core and the first segment of the second waveguide. Other segments of the second waveguide core may have a vertical thickness that does not vary. The second waveguide core may be provided in a variety of shapes, sizes, configurations, and/or positions within the cladding material to adapt the polarizer to different types of devices and/or signals. The cladding material surrounding the first waveguide core may be the same as, or different from, the cladding material surrounding the second waveguide core. Moreover, any and all regions of cladding material may themselves include one or more different materials.

Embodiments of the disclosure provide a method of forming an optical polarizer in a PIC die. Referring initially to FIG. 1, an initial structure 50 for forming an optical polarizer is illustrated. According to embodiments of the disclosure, initial structure 50 may include materials that are also used to form portions of a device layer, e.g., several transistors, in a complementary metal oxide semiconductor (CMOS) region elsewhere on the same device. Initial structure 50 may include a substrate 52 at least partially formed of any currently known or later developed semiconductor material, which may include without limitation: silicon, germanium, silicon germanium, and substances consisting essentially of one or more III-V compound semiconductors having a composition defined by the formula $Al_{X1}Ga_{X2}In_{X3}As_{Y1}P_{Y2}N_{Y3}Sb_{Y4}$, where X1, X2, X3, Y1, Y2, Y3, and Y4 represent relative proportions, each greater than or equal to zero and X1+X2+X3+Y1+Y2+Y3+Y4=1 (1 being the total relative mole quantity). Substrate 52 may have a composition that is similar or identical to various semiconductor waveguide structures for transporting optical signals within an optical polarizer, as discussed herein.

Methods according to the disclosure may include forming part of a first cladding material 54 (e.g., one or more transparent insulators such as an oxide insulator, or other materials for coating of a waveguide) on substrate 52. First cladding material 54 may include any currently known or later developed electrically insulative, optically transparent substance. As examples, first cladding material 54 may silicon oxide ($SiO_2$), and/or any other currently known or later developed cladding materials such as various oxides and/or polymers. Such materials may be selected to have a lower refractive index than that of waveguide materials for the PIC die, e.g., thus allowing optical signal modes (e.g., TE or TM mode signals) to pass through first cladding material 54 as discussed herein. Thus, first cladding material 54 is structured to allow radiation to pass therethrough in addition to providing an electrical insulator. First cladding material 54 may be formed on substrate 54 and may be partially formed as a first portion 54a before waveguide core material(s) is/are formed thereon.

Initial structure 50 includes a first waveguide core 56 on first cladding material 54 (e.g., on first portion 54a). First waveguide core 56 may be formed from any currently known or later developed semiconductor material, e.g., silicon in single crystal and/or polycrystalline form, silicon germanium (SiGe), etc. In further implementations, any of the various example semiconductor implementations discussed with respect to substrate 52 may be operable for use in first waveguide core 56 and/or other waveguides or waveguide precursor structures discussed herein. However embodied, first waveguide core 56 may be operatively coupled to an optical signal source 110 (FIG. 10) that outputs optical signals to be processed using embodiments of an optical polarizer. Both TE and TM mode signals may propagate inside first waveguide core 56, with one of the two modes exiting first waveguide core 56 and entering a second waveguide core 64 (FIG. 6) of the eventual optical polarizer structure as discussed below. First waveguide core 56 may be formed substantially in accordance with any currently known or later developed method to form a waveguide over a substrate (e.g., deposition and etching to a desired shape).

As used herein, the term "substantially uniform vertical thickness" refers to a segment of waveguide having a vertical thickness that varies by no more than, e.g., approximately five percent of its mean or median vertical thickness. That is, the upper and/or lower surface(s) of the waveguide may include peaks and troughs exhibiting variation in the actual thickness, but the waveguide segment itself may have a "substantially uniform thickness" so long as such peaks and troughs do not produce more than a five percent variation in the total vertical thickness of the waveguide. A waveguide segment of substantially uniform vertical thickness thus does not have an appreciable increase or decrease in vertical thickness from one of its lengthwise ends to its opposing lengthwise end.

First waveguide core 56 may be formed as any suitable optical element or structure that is configured to transport and/or receive optical signals. In a non-limiting example, first waveguide core 56 may be formed from a layer or other region of crystalline silicon, silicon nitride, and/or or other similar materials. First waveguide core 56 may be made of materials including, for example, silicon, silica, and/or silica doped material. In other non-limiting examples, first waveguide core 56 may be formed as and/or may be coupled to one or more fluoride fibers, chalcogenide fibers, and/or plastic fibers.

Figure 2:
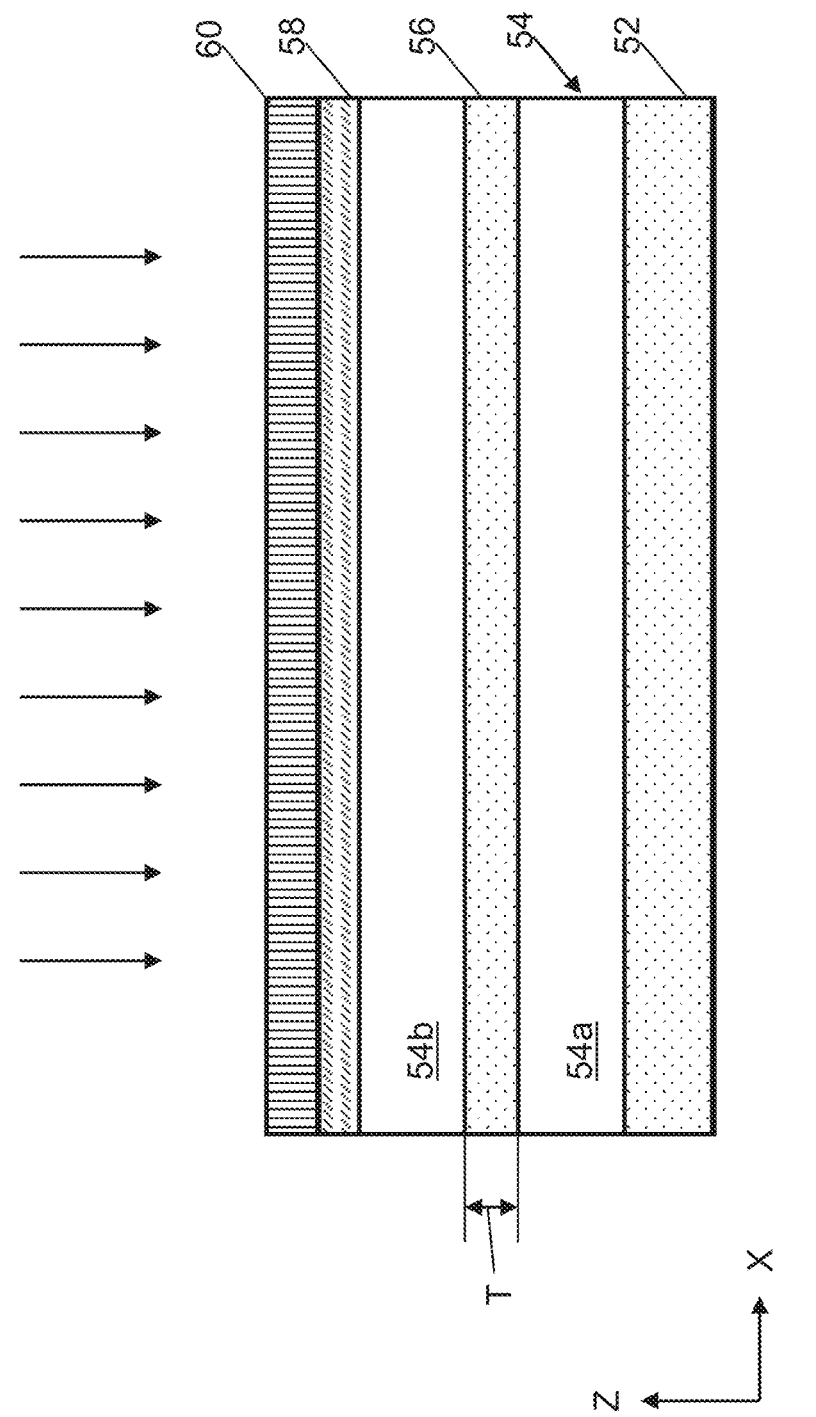

Referring to FIG. 2, continued processing may include forming a second portion 54b of first cladding material 54 on first waveguide core 56, e.g., such that second portion 54b covers, horizontally abuts, and optionally partially surrounds first waveguide core 56 (e.g., out of the plane of FIG. 2). Thus, first portion 54a and second portion 54b may contact each other and define one continuous region along cross-sections that are in front of or behind the plane shown in FIG. 2. Second portion 54b may have the same composition or a similar composition to first portion 54a, such that no interface is visible between portions 54a, 54b of first cladding material 54. In other words, first waveguide core 56 is embedded inside first cladding material 54. In alternative implementations, second portion 54b may have a different composition (e.g., any other material discussed herein regarding first cladding material 54). Second portion 54b may cover first waveguide core 56 such that additional materials formed on cladding material 54 are located above, and vertically displaced from, first waveguide core 56. Continued processing may include forming a waveguide core material 58 and masking material 60 over cladding material 54. Waveguide material 56 may include any of the various materials discussed herein regarding first waveguide core 56, and in a specific implementation may include silicon nitride (SiN) or other nitride waveguide materials.

FIG. 2 depicts forming masking material 60, e.g., one or more photoresist materials for targeting and processing underlying materials. Masking material 60 may be used to form additional waveguides over first waveguide core 56. Masking material 60 may include, e.g., polymethylmethacrylate (PMMA) and/or other spin-coated thin films are suitable for use as resist films in micro/nanofabrication processes. Masking material 60 may be formed, e.g., by deposition. Deposition may include any now known or later developed techniques appropriate for the material to be deposited including but are not limited to, for example: chemical vapor deposition (CVD), low-pressure CVD (LPCVD), plasma-enhanced CVD (PECVD), semi-atmosphere CVD (SACVD) and high density plasma CVD (HDPCVD), rapid thermal CVD (RTCVD), ultra-high vacuum CVD (UHVCVD), limited reaction processing CVD (LRPCVD), metalorganic CVD (MOCVD), sputtering deposition, ion beam deposition, electron beam deposition, laser assisted deposition, thermal oxidation, thermal nitridation, spin-on methods, physical vapor deposition (PVD), atomic layer deposition (ALD), chemical oxidation, molecular beam epitaxy (MBE), plating, evaporation. Continued processing may include, e.g., modifying the shape of masking material 60 to allow further processing of waveguide core material 58 thereunder to form the waveguide components of an optical polarizer.

Figure 3:
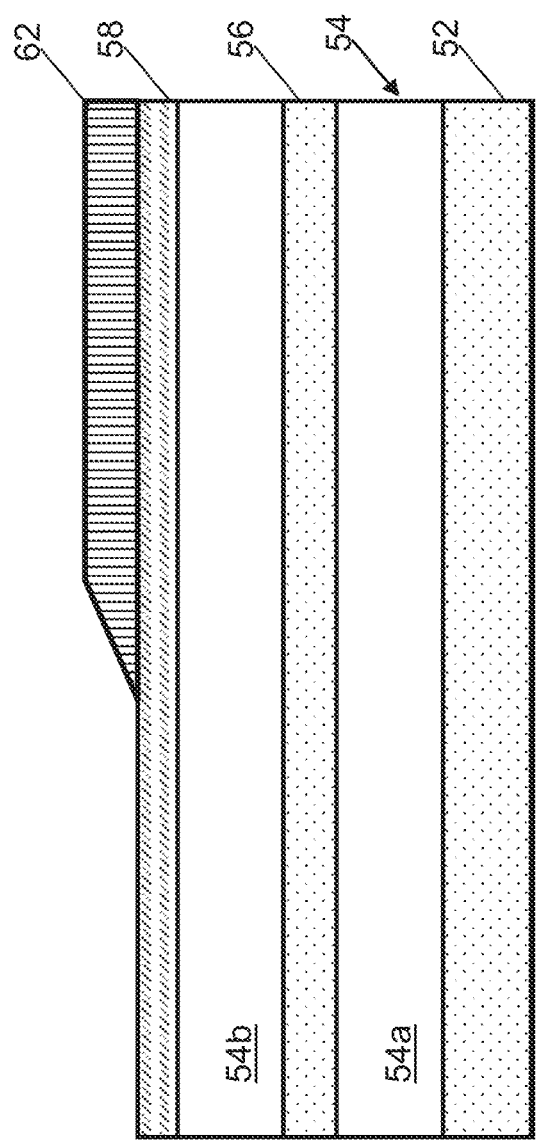

Referring to FIG. 3, masking material 60 (FIG. 2) may be converted into a patterned resist 62 by lithographically patterning openings or contours, etching selected portions of masking material 62, and stripping any remaining material. In some implementations, masking material 60 may be processed by exposure to dose modulated electron beams to produce a tapered upper surface, e.g., by completely and partially removing some areas of masking material 60 while leaving others intact, or by removing more masking material 60 in some areas than other areas. Thereafter, the partially processed masking material 60 may be subjected to an elevated temperature (e.g., 120° C.) to produce a smoothened upper surface. According to an example, some portions of patterned masking material 62 may retain one thickness, such as their initial vertical thickness, other portions may have a non-uniform (e.g., tapered) vertical thickness, and waveguide core material 58 may be exposed without being covered by patterned masking material 62 in other locations. Masking material 62 may take a variety of shapes to produce a variety of structural features when processing waveguide core material 58 as discussed herein.

Figure 4:
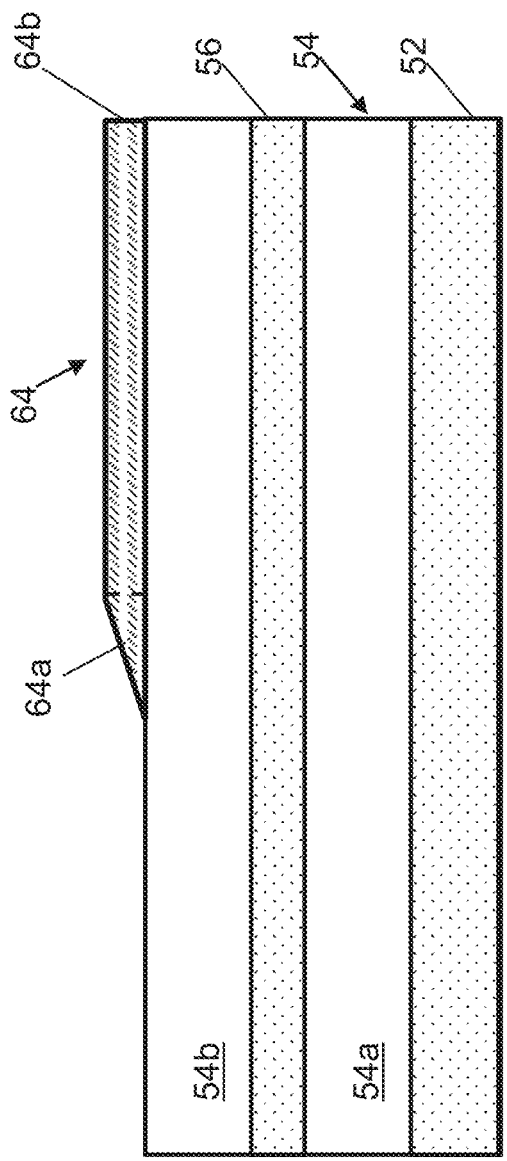

Through patterned masking material 62, portions of waveguide core material 58 may be processed into the shape of a second waveguide core 64 over first waveguide core 56 (FIG. 4). For example, with patterned masking material 62 in place, further processing may include proportional dry etching and/or other techniques to remove uppermost material from a structure. Such etching may cause patterned masking material 62 and portions of waveguide core material 58 thereunder to be removed. The composition(s) of waveguide core material 58 and patterned masking material 62 may have the same etch rate or a similar etch rate, in the case of removal by etching. The compounds and/or application times of processes to remove material may be timed such that patterned masking material 62 is completely removed and the original structure of patterned masking material 62 is substantially duplicated in waveguide core material 58 to yield second waveguide core 64.

Processing via masking material 62 may cause second waveguide core 64 to include a first segment 64a with a varying vertical thickness along the length of second waveguide core 64. Second waveguide core 64 may also include a uniform segment 64b having a non-varying vertical thickness along its length. In some cases, uniform segment 64b may have substantially the same vertical thickness as first waveguide core 56 thereunder. In other implementations, second waveguide core 64 may have a similar or different vertical thickness within uniform segment 64b as compared to the vertical thickness of first waveguide core 56. The presence of first segment 64a with a varying vertical thickness (e.g., a tapered shape) may allow gradual entry of TE or TM mode optical signals from first waveguide core 56 across its length. The shape of first segment 64a (e.g., tapering from thinnest end to thickest end) allows TE or TM mode optical signals to gradually enter second waveguide core 64, thereby improving optical polarization as compared to polarizer structures which lack first segment 64a or similarly shaped waveguide structures.

Figure 5:
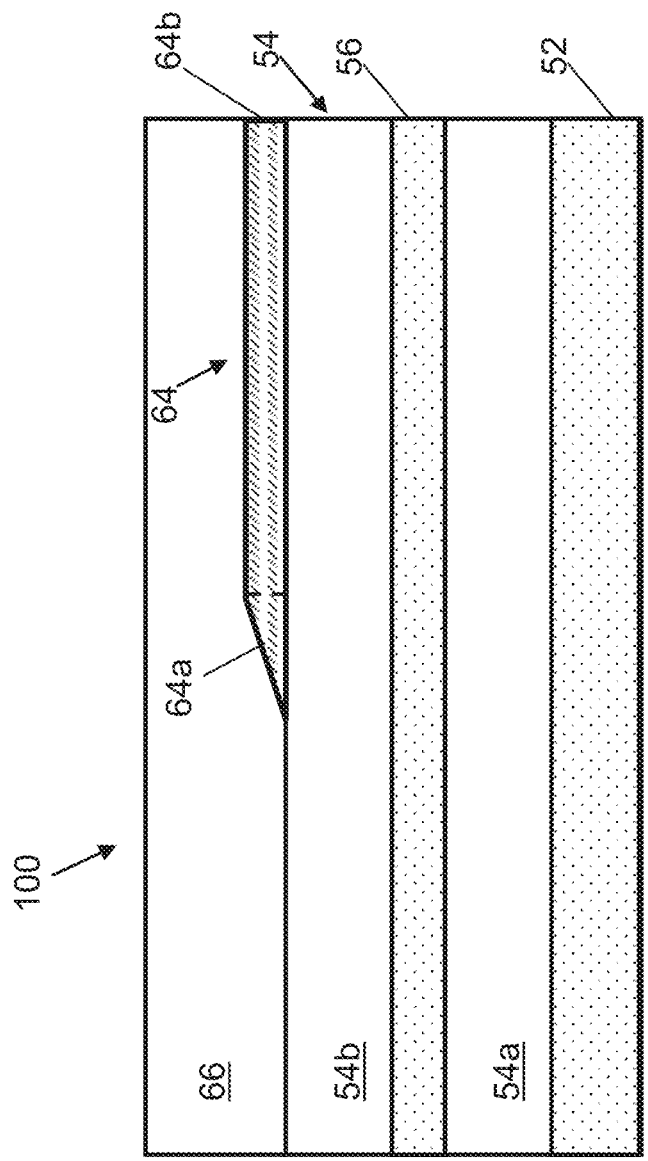

Turning to FIG. 5, additional processing may include forming a second cladding material 66 on second waveguide core 64 (including segments 64a, 64b thereof) and second portion 54b of first cladding material 54. Second cladding material 66 may have a same or similar composition to first cladding material 54 and may be formed to partially surround second waveguide core 64. In various alternative implementations, a portion of second cladding material 66 may be formed on first cladding material 54, with second waveguide core 64 being formed on the initial portion of second cladding material 66. In such implementations, second cladding material 66 may completely surround second waveguide core 64. In any case, second cladding material 66 may cover second waveguide core 64 and thus define an upper surface of an optical polarizer structure (simply "optical polarizer" or "polarizer" hereafter) 100. Additional portions of and/or structures for a PIC die can be formed on and/or adjacent optical polarizer 100 to defining remaining portions of a device. Optical polarizer 100 may take the form shown in FIG. 5, and/or may include other features formed substantially in accordance with the various processes discussed herein.

Figure 6:
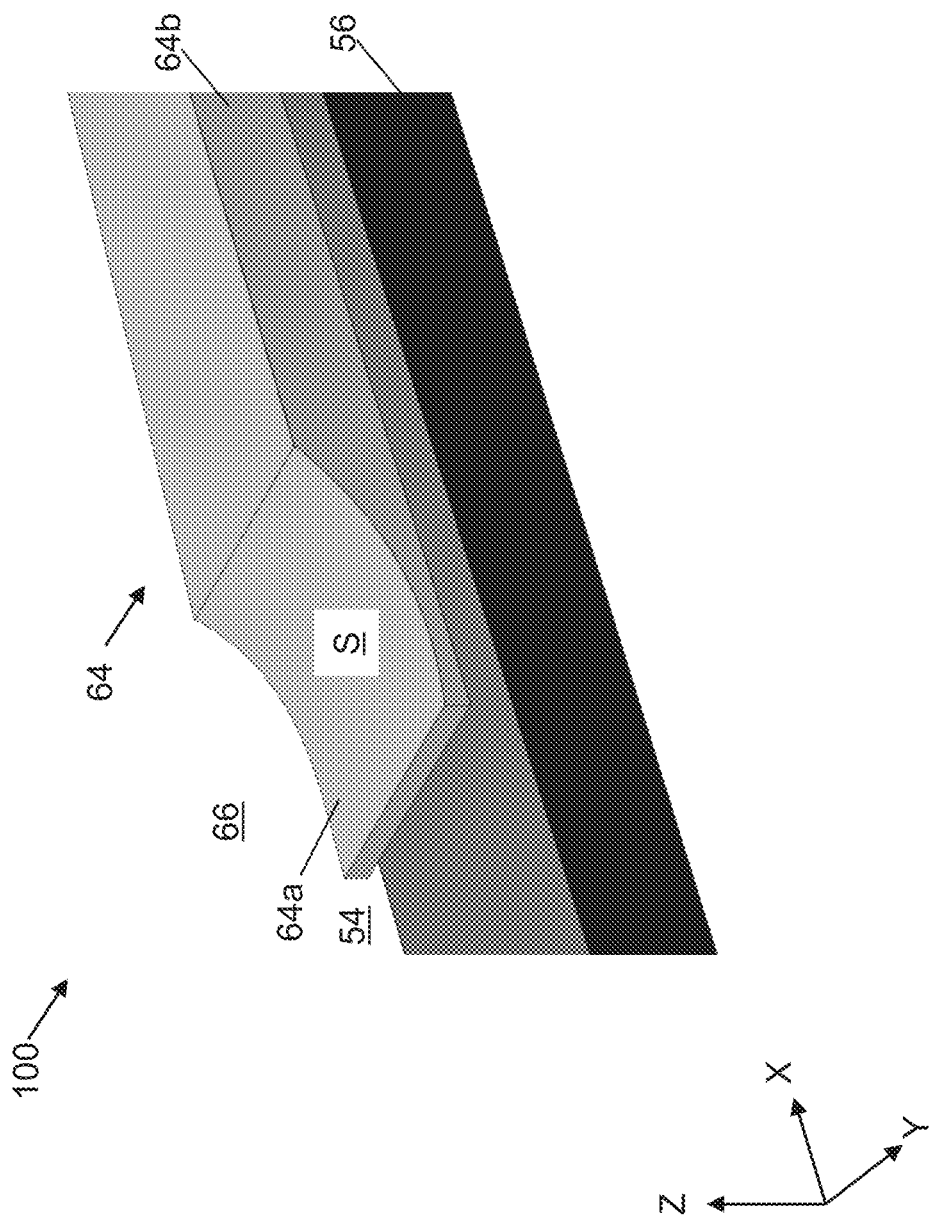
FIG. 6 shows a partial perspective view of an optical polarizer according to embodiments of the disclosure.

Referring to FIGS. 6-9, perspective and cross-sectional views of optical polarizer 100 are shown, in which first segment 64a of second waveguide core 64 includes an upper surface S that is concave along a length of first segment 64a. FIG. 6 provides a perspective view of optical polarizer 100, FIGS. 7 and 8 provide Y-Z cross-sections of optical polarizer 100 to show the varying vertical thickness in each segment 64a, 64b, and FIG. 9 provides a cross-sectional view in plane X-Z to illustrate the concavity of upper surface S. Optical signals having TE and TM mode components may enter first waveguide core 56 from an optical signal source 110 coupled, e.g., to an end of first waveguide core 56 directly and/or through intervening waveguides or optical media (not shown). The concavity of upper surface S (e.g., the rate at which vertical thickness changes with respect to the length of first segment 64a) may be chosen to allow gradual entry of TM or TE mode signals from first waveguide core 56 in first segment 64a of second waveguide core 64. Providing second waveguide core 64 with concavity in upper surface S may produce, e.g., stronger contrast in the strength of TE or TM mode optical signals in portions of first segment 64a that are nearer to second segment 64b than portions of first segment 64a that are further away from second segment 64b. In first segment 64a (i.e., the thinner portion of second waveguide core 64), TM mode optical signals can efficiently couple to the composition of second waveguide core 64 (e.g., SiN) with reduced back reflection than in second segment 64b. In second segment 64b, TE or TM mode signals have already entered second waveguide core 64 and thus will not return or reflect to the structure of first waveguide core 56.

Figure 10:
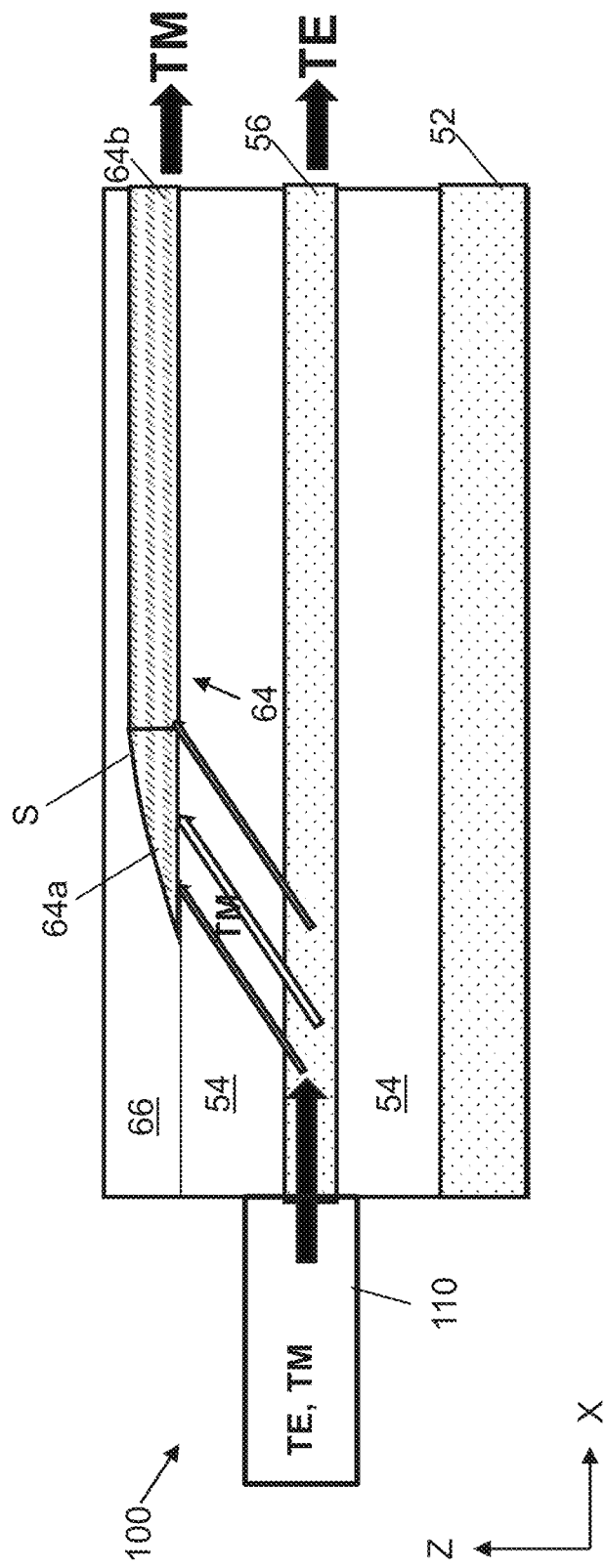
FIG. 10 shows a cross-sectional view in plane X-Z of an optical polarizer and signal pathways according to embodiments of the disclosure.

Referring to FIGS. 9 and 10, upper surface S of first portion 64a may take a variety of forms. In the FIG. 10 example, upper surface S is substantially convex, i.e., its vertical thickness increases more sharply with respect to length at locations that are further away from uniform segment 64b. The convex shape of upper surface S in second waveguide core 64 may allow gradual entry of TM or TE mode signals from first waveguide core 56, but at a faster rate with respect to length than in other implementations in which upper surface S is concave. The shape of upper surface S can be defined to control the entry of TE or TM mode signals from first waveguide core 56 in second waveguide core 64, while maintaining the benefits of a varying vertical thickness with respect to length.

FIGS. 11-13 depict an implementation of optical polarizer 100 in which a first waveguide core 156 includes a first segment 156a with a varying vertical thickness with respect to a length of first waveguide core 156, and a uniform segment 156b having a vertical thickness that does not vary along the length of first waveguide core 156. FIGS. 11 and 12 provide cross-sectional views of optical polarizer in plane Y-Z to show the varying vertical thickness of first waveguide core 156 at two locations. FIG. 13 provides a cross-sectional view in plane X-Z to show the profile of each segment 156a, 156b of first waveguide core 156. Here, first waveguide core 156 is coupled to optical signal source 110 at one end, e.g., the edge of a chip. First waveguide core 156 includes first segment 156a coupled to optical signal source 110 (e.g., directly via its thinnest portion) and vertically below a second waveguide core 164. Second waveguide core 164 may be within first cladding material 54 and in vertical alignment with first waveguide core 156. A TE or TM mode component from optical signal source 110 may immediately start passing from first waveguide core 156 into second waveguide core 164 within first segment 156a due to the changing vertical thickness in first segment 156a. However, the gradually increasing vertical thickness of first waveguide core 156 within first segment 156a reduces back reflection from second waveguide core 164 into first waveguide core 156 in substantially the same manner as other embodiments (e.g., where second waveguide core 64 (FIGS. 4-10) has a varying vertical thickness.

The varying vertical thickness with respect to length in first segment 156a of first waveguide core 156 allows gradual entry of TE or TM mode signals from first waveguide core 156 into second waveguide core 164. Second waveguide core 164, despite possibly having a uniform thickness, may allow TE or TM mode signals to pass from first waveguide core 156 into second waveguide core 164 at a non-uniform rate because the varying vertical thickness within first segment 156a reduces the polarization in thinner portions of first segment 156a of first waveguide core 156. Thus, optical polarizer 100 as implemented in the example of FIGS. 11-13 may operate substantially identically to implementations where second waveguide core 64 (FIGS. 4-10) has a non-uniform vertical thickness while first waveguide core 56 (FIGS. 4-10) has a uniform vertical thickness, even though second waveguide core 164 is coupled to optical signal source 110 and located above first waveguide core 156.

Figure 14:
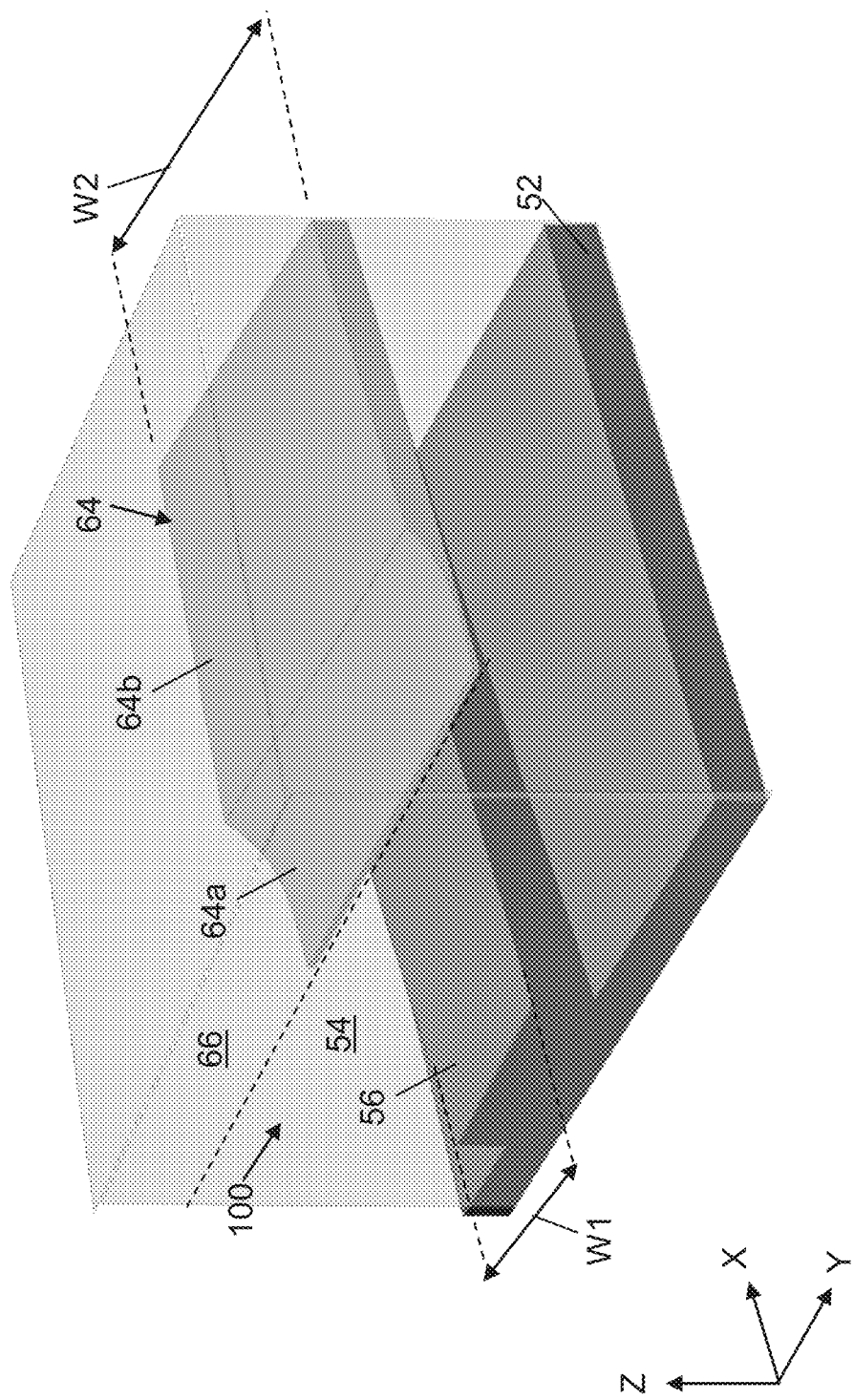
FIG. 14 shows a partial perspective view of an optical polarizer with waveguide cores having different horizontal widths according to embodiments of the disclosure.

FIG. 14 depicts a perspective view of optical polarizer 100 in which first waveguide core 56 includes additional structural features to further control entry of TM or TE mode optical signals into second waveguide core 64. For example, first waveguide core 56 may have a horizontal width W1 in plane Y-Z that is significantly less (e.g., half the size or less) than a corresponding horizontal width W2 of second waveguide core 64 thereover. This difference in horizontal widths may further aid, e.g., the passage of TE or TM mode optical signals from first waveguide core 56 into first segment 64a of second waveguide core 64. Specifically, the reduced horizontal width of first waveguide core 56 may further prevent back reflection of TE or TM mode signals from second waveguide core 64 into first waveguide core 56 during operation. It is also understood that the relative sizes of each horizontal width W1, W2 may be reversed (e.g., first waveguide core 56 may be wider than second waveguide core 64). Additionally, the differences in horizontal width discussed herein may be included in other implementations of optical polarizer 100 discussed herein (e.g., those with first waveguide core 156 (FIGS. 11-13) and second waveguide core 164 (FIGS. 11-13)).

Figure 15:
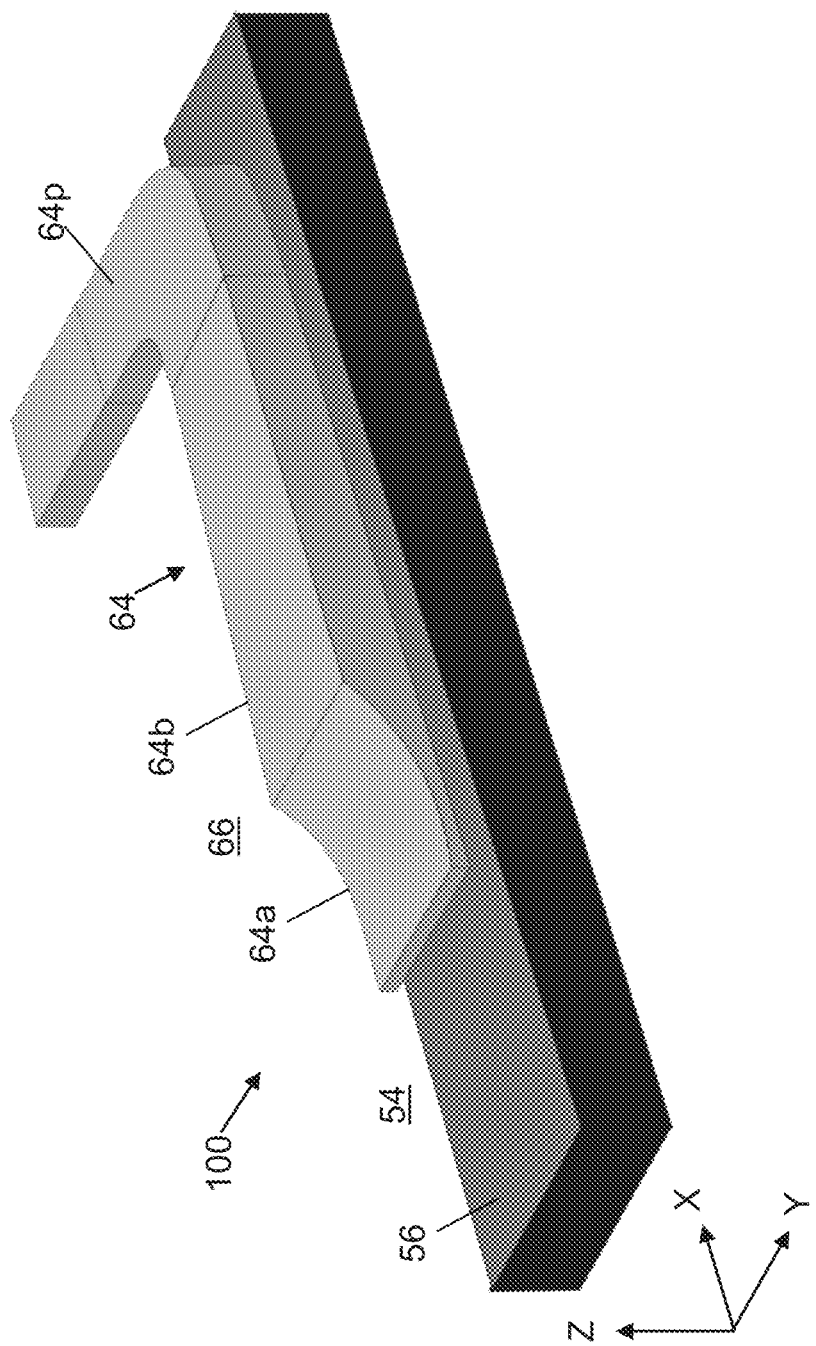
FIG. 15 shows a partial perspective view of an optical polarizer with a horizontally perpendicular section according to embodiments of the disclosure.

FIG. 15 depicts a further implementation of optical polarizer 100, in which portions of each waveguide core 56, 64 extend in non-parallel orientations with respect to each other. For instance, second waveguide core 64 may include an additional segment 64p that extends horizontally perpendicularly away from segments 64a, 64b (e.g., in plane X-Y in the FIG. 15 example). Additional segment 64p, furthermore, may have an orientation that is horizontally perpendicular to the length of first waveguide core 56. Additional segment 64p is illustrated as extending away from other segments 64a, 64b of second waveguide core 64. However, the presence of first segment 64a with a non-uniform vertical thickness allows TE or TM mode signals to pass from first waveguide core 56 substantially as discussed elsewhere herein before being propagated along the direction of additional segment 64p. The presence of additional segment 64p does not interfere with the passage of TE or TM mode optical signals into first segment 64a or similar components in waveguide core(s) 56, 64, e.g., because TE or TM mode signals enter first segment 64a of second waveguide core 64. It is also understood that in still further implementations, additional segment 64p may be coupled to first segment 64a rather than to uniform segment 64b, and/or that similarly oriented segments may additionally or alternately be coupled to first waveguide core 56 rather than, or in addition to, second waveguide core 64. Horizontally perpendicular segments such as additional segment 64p further may be included in implementations of optical polarizer 100 which include first waveguide core 156 (FIGS. 11-13) and second waveguide core 164 (FIGS. 11-13)). Including additional segment 64p in optical polarizer 100 may allow the benefits of first segment 64a and/or similar waveguide components to be achieved in waveguide structures having a variety of orientations. Here in FIG. 15, and similarly as discussed below regarding FIGS. 16-17, some portions of cladding material(s) 54, 66 and/or their boundaries that surround waveguide core(s) 56, 64 are not shown both for simplicity and for providing a clearer view of the relevant structures and/or examples.

Figure 16:
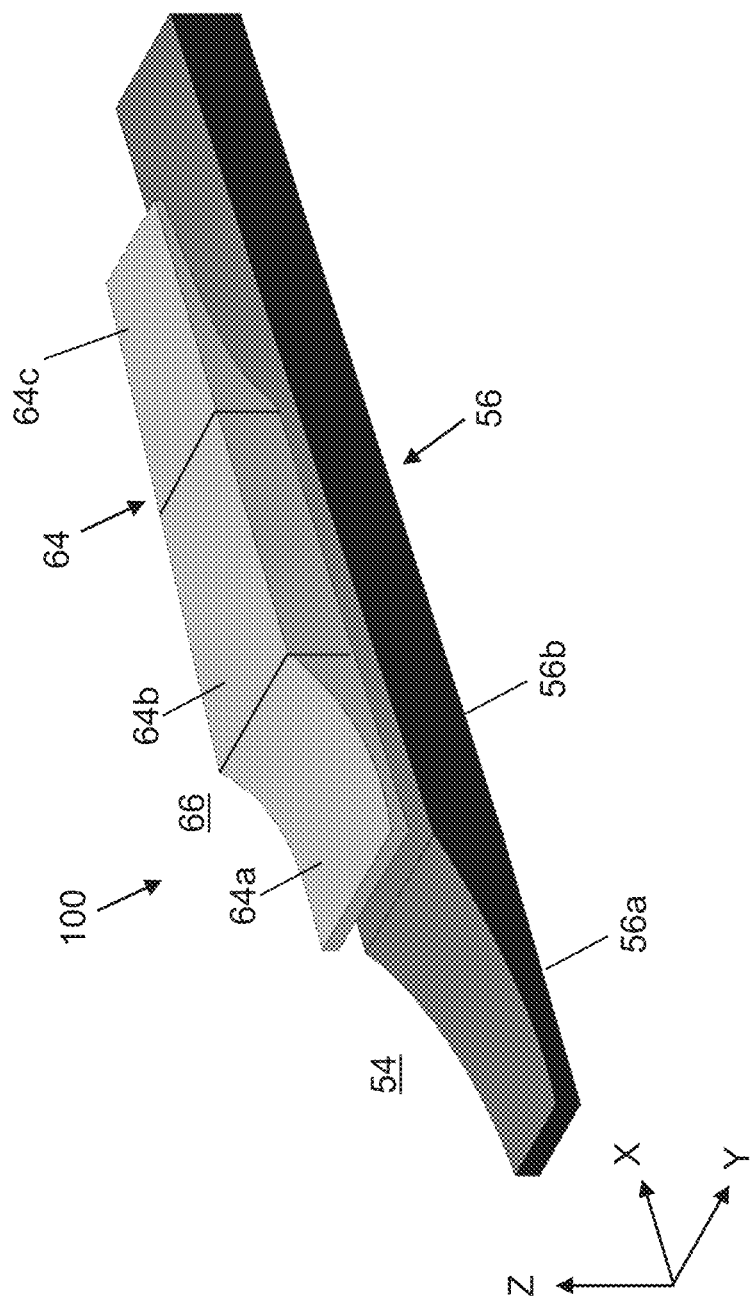
FIG. 16 shows a perspective view of an optical polarizer with multiple waveguide cores of varying vertical thickness according to embodiments of the disclosure.
Figure 17:
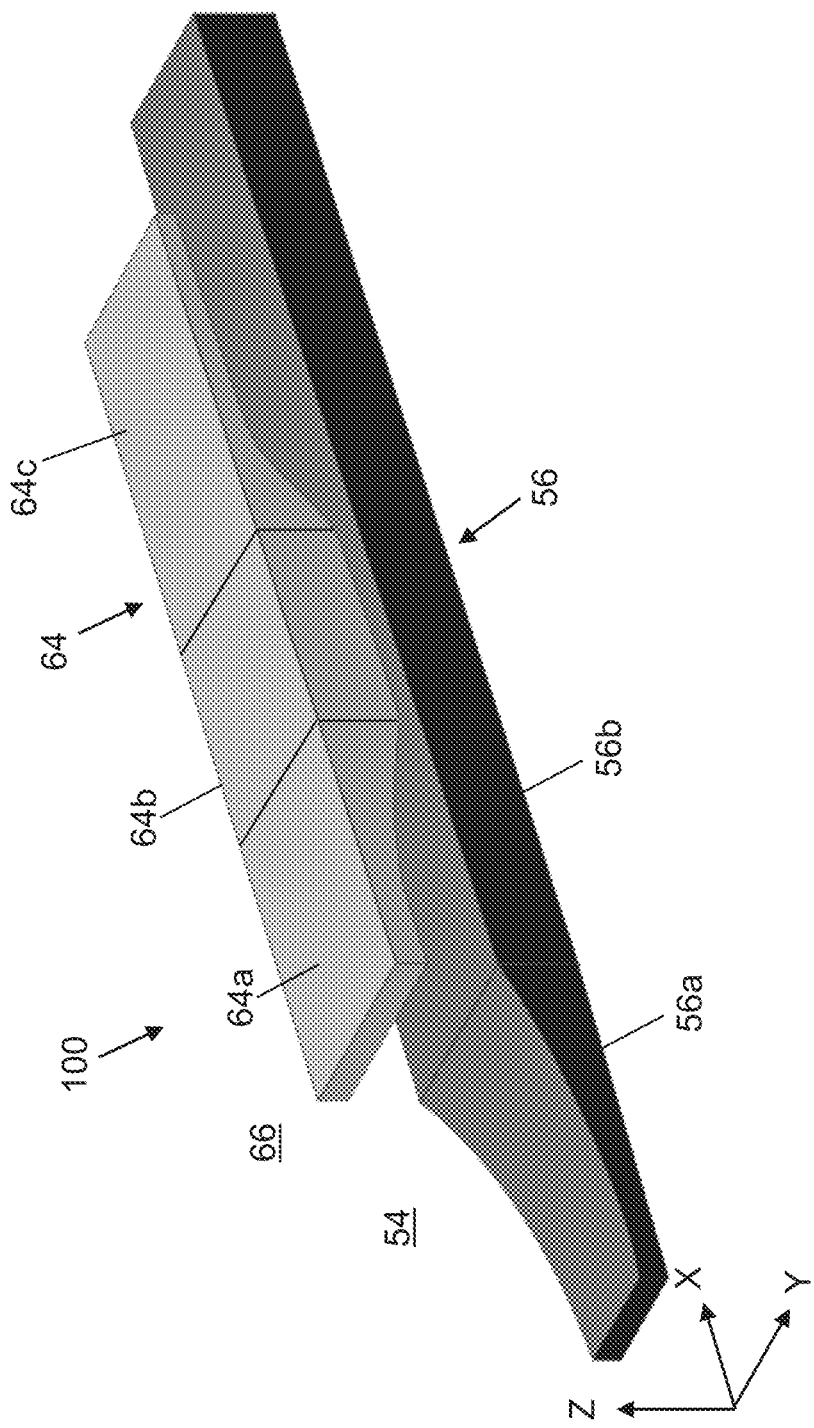
FIG. 17 shows a perspective view of an optical polarizer with multiple waveguide core segments having a varying vertical thickness according to embodiments of the disclosure.

FIGS. 16 and 17 depict still further implementations of optical polarizer 100 in which waveguide core(s) 56, 64 include additional segments with varying vertical thicknesses (e.g., additional upward or downward tapering). As shown in FIGS. 16 and 17, first waveguide core 56 may include a first segment 56a with a varying (e.g., increasing) vertical thickness along its length. Additionally or alternatively, as also shown in FIGS. 16 and 17, second waveguide core 64 may include a second segment 64c with a varying vertical thickness along a length of second segment 64c. Second segment 64c, where included, may be coupled to uniform segment 64b at an end opposite first segment 64a. In this case, uniform segment 64b of second waveguide core 64 separates first segment 64a from second segment 64c. The presence of multiple segments with varying thickness (e.g., first segment 64a and second segment 64c) allows gradual coupling of polarized light from first waveguide core 56 into second waveguide core 64 in multiple locations, with reduced back reflection. Changing the vertical thickness of second waveguide core 64 in first segment 64a and second segment 64c may also change the refractive index within second waveguide core 64. Larger vertical thicknesses produce a higher refractive index, while smaller vertical thicknesses produce a lower refractive index. First segment 64a may be used for gradual entry of TE or TM mode signals from first waveguide core 56 when a higher refractive index is needed, and second segment 64c may be used to gradually accept entry of such signals from first waveguide core 56 when a lower refractive index is preferable.

The directional orientation(s) of segment(s) 64a, 64c relative to first waveguide core 56 may vary between implementations. For instance, FIG. 16 depicts first segment 64a as having a sloped surface that faces away from first waveguide core 56. FIG. 17 provides an example in which first segment 64a has a sloped surface that faces toward first waveguide core 56. Such alternatives may also be included within first segment 56a of first waveguide core 56, second segment 64c of second waveguide core 64, and/or other implementations or embodiments described herein. Despite the surface(s) where tapering occurs in second waveguide core 64, the varying vertical thickness in first segment 64a and/or second segment 64c may allow gradual entry of TE or TM mode optical signals in substantially the same manner as other embodiments discussed herein. The differences in size, shape, and location of segments with varying thickness in waveguides cores 56, 64 may be used to accommodate various corresponding components in a PIC die coupled to optical polarizer 100. Different implementations and/or configurations may be used together or separately based on the mode(s) to be polarized, the type or intensity of optical signals to be processed, and/or the types of devices where optical polarizer(s) 100 is/are implemented.

Embodiments of the disclosure may provide various technical and commercial advantages, some of which are discussed by example herein. Including a segment of varying vertical thickness within a waveguide for an optical polarizer produces low back reflection and related favorable behavior (e.g., low ratio of signal loss to signal transmission) in optical polarizer 100 as compared to conventional polarizers. The reductions in back reflection moreover can be achieved without increasing the size of the optical polarizer structure(s) and prevent signal crosstalk from impeding the operation of a device. The wide variety of possible implementations (e.g., shapes, sizes, and configurations) discussed herein may provide substantially the same technical effects while offering substantial control for deployment in different applications or settings.

The terminology used herein is for the purpose of describing embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments were chosen and described to best explain the principles of the disclosure and the practical application, and to enable others of ordinary skill in the art to understand the disclosure for various embodiments with various modifications as are suited to the particular use contemplated.

What is claimed is:

1. An optical polarizer, comprising:
a first waveguide core over a semiconductor substrate, the first waveguide core including a first segment having a substantially concave upper surface;
a first cladding material on at least an upper surface of the first waveguide core;
a second waveguide core over the first waveguide core and above the first cladding material, wherein the second waveguide core includes a first segment having a vertical thickness that varies along a length of the first segment; and
a second cladding material at least partially surrounding the second waveguide core,
wherein transfer of one of a transverse electric (TE) mode signal and a transverse magnetic (TM) mode signal from the first waveguide core to the second waveguide core occurs between the first segment of the second waveguide core and the first segment of the first waveguide core.

2. The optical polarizer of claim 1, wherein a composition of the first waveguide core is different from a composition of the second waveguide core.

3. The optical polarizer of claim 1, wherein a second segment of the first waveguide core coupled to the first segment has a substantially uniform vertical thickness.

4. The optical polarizer of claim 1, wherein a horizontal width of the second waveguide core is larger than a horizontal width of the first waveguide core.

5. The optical polarizer of claim 1, wherein an upper surface of the first segment of the second waveguide core, when viewed in a cross-section along the length of the first segment, has a substantially concave or convex shape.

6. The optical polarizer of claim 1, wherein a portion of the second waveguide core is vertically above and aligned with the first waveguide core.

7. The optical polarizer of claim 1, wherein the second waveguide core further includes:
an additional segment coupled to the first segment, the additional segment having a substantially uniform vertical thickness; and
a second segment coupled to the additional segment, the second segment having a vertical thickness that varies along a length of the second segment.

8. The optical polarizer of claim 1, wherein the first cladding material or the second cladding material includes an oxide material.

9. An optical polarizer, comprising:
a first waveguide core over a semiconductor substrate and including a first segment having a vertical thickness that varies along a length of the first segment, and a second segment coupled to the first segment and having a substantially uniform vertical thickness, wherein the first segment and second segment have substantially coplanar bottommost surfaces;
at least one oxide layer on an upper surface of the first waveguide core; and
a second waveguide core on the at least one oxide layer and vertically aligned with the first waveguide core, wherein the second waveguide core includes a first segment having a vertical thickness that varies along a length of the first segment,
wherein one of a transverse electric (TE) mode signal and a transverse magnetic (TM) mode signal is coupled between the first waveguide core and the first segment of the second waveguide core.

10. The optical polarizer of claim 9, wherein a composition of the first waveguide core is different from a composition of the second waveguide core.

11. The optical polarizer of claim 9, wherein an upper surface of the first segment, when viewed in a cross-section along the length of the first segment, has a substantially concave or convex shape.

12. The optical polarizer of claim 9, wherein the second waveguide core further includes:
a second segment having a vertical thickness that varies along a length of the second segment; and
an additional segment having a substantially uniform vertical thickness, the additional segment couples to the first segment at a first end and to the second segment at a second end.

13. The optical polarizer of claim 12, wherein the first segment tapers along an upper surface of the second waveguide core, and wherein the second segment tapers along a lower surface of the second waveguide core.

14. A method of forming an optical polarizer, the method comprising:
forming a first waveguide core over a substrate, the first waveguide core including a first segment having a substantially concave upper surface;
forming a first cladding material over the substrate and on at least an upper surface of the first waveguide core;
forming a second waveguide core over the first waveguide core and the first cladding material, wherein the second waveguide core includes a first segment having a vertical thickness that varies along a length of the first segment; and forming a second cladding material on the first cladding material and at least partially surrounding the second waveguide core,
wherein transfer of one of a transverse electric (TE) mode signal and a transverse magnetic (TM) mode signal from the first waveguide core to the second waveguide core occurs between the first segment of the second waveguide core and the first segment of the first waveguide core.

15. The method of claim 14, further comprising:
forming the first cladding material on at least the upper surface and adjacent the first waveguide core, wherein the second cladding material covers sidewalls of bottom surface of the second waveguide core.

16. The method of claim 15, wherein forming the second waveguide core includes forming the second waveguide core to have a horizontal width greater than a horizontal width of the first waveguide core.

17. The method of claim 14, wherein the first waveguide core includes a silicon material, the second waveguide core includes a nitride material, and the second waveguide core is formed vertically above the first waveguide core.

18. The method of claim 14, wherein the first cladding material or the second cladding material includes an oxide.

19. The method of claim 14, further comprising forming a second segment within the second waveguide core and coupled to the first segment, the second segment having a vertical thickness that varies along a length of the second segment.

20. The optical polarizer of claim 7, wherein the first segment of the second waveguide core includes a first substantially concave bottom surface, and wherein the second segment of the second waveguide core includes a second substantially concave bottom surface.

* * * * *